(12) United States Patent
Yoshikane et al.

(10) Patent No.: US 11,161,213 B2
(45) Date of Patent: Nov. 2, 2021

(54) DUST COLLECTION SYSTEM FOR POWER TOOL

(71) Applicant: MAKITA CORPORATION, Anjo (JP)

(72) Inventors: Kiyonobu Yoshikane, Anjo (JP); Keita Mori, Anjo (JP); Yoshitaka Machida, Anjo (JP); Yu Kobayashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 50 days.

(21) Appl. No.: 16/784,485

(22) Filed: Feb. 7, 2020

(65) Prior Publication Data

US 2020/0306906 A1  Oct. 1, 2020

(30) Foreign Application Priority Data

Mar. 26, 2019  (JP) .............. JP2019-058950

(51) Int. Cl.
- *B23Q 11/00* (2006.01)
- *B23Q 17/00* (2006.01)
- *B25F 5/02* (2006.01)

(52) U.S. Cl.
CPC ...... *B23Q 11/0071* (2013.01); *B23Q 11/0046* (2013.01); *B23Q 17/007* (2013.01); *B25F 5/02* (2013.01)

(58) Field of Classification Search
CPC .............. B23Q 11/006; B23Q 11/0071; B23Q 11/0046; B25F 5/02
USPC .................................... 173/75, 77, 197, 198
See application file for complete search history.

(56) References Cited

U.S. PATENT DOCUMENTS

| | | | | |
|---|---|---|---|---|
| 2012/0234570 A1* | 9/2012 | Machida | ............ | B23Q 11/0046 173/197 |
| 2012/0273243 A1* | 11/2012 | Tada | .................. | B23Q 11/0071 173/198 |
| 2012/0298391 A1* | 11/2012 | Kakiuchi | ........... | B23Q 11/0046 173/77 |
| 2012/0318553 A1* | 12/2012 | Chen | .................. | B23Q 11/0046 173/198 |
| 2013/0031879 A1* | 2/2013 | Yoshikane | ......... | B23Q 11/0046 55/356 |
| 2013/0055523 A1* | 3/2013 | Yoshikane | ......... | B23Q 11/0046 15/347 |
| 2013/0213683 A1* | 8/2013 | Brewster | ................ | B23Q 11/00 173/198 |
| 2014/0020922 A1* | 1/2014 | Ikuta | ...................... | B25D 17/22 173/198 |
| 2014/0138114 A1* | 5/2014 | Takeuchi | ................ | B25F 5/026 173/198 |

(Continued)

FOREIGN PATENT DOCUMENTS

JP   2018-069397 A   5/2018

*Primary Examiner* — Eyamindae C Jallow
(74) *Attorney, Agent, or Firm* — Oliff PLC

(57) ABSTRACT

Appropriate control is performed in accordance with the state of a power tool and/or a dust collection attachment. A dust collection system for a power tool includes a hammer drill to hold a bit, a dust collection attachment connected to the hammer drill, and a dust collection controller that controls the operation of the hammer drill and/or the dust collection attachment in accordance with the specifications of the hammer drill and/or the dust collection attachment.

18 Claims, 6 Drawing Sheets

(56) References Cited

U.S. PATENT DOCUMENTS

| | | | |
|---|---|---|---|
| 2016/0129540 A1* | 5/2016 | Tiede | B23Q 11/0046 173/197 |
| 2017/0100809 A1* | 4/2017 | Furusawa | B23Q 11/0071 |
| 2017/0232565 A1* | 8/2017 | Machida | B25F 5/00 173/198 |

* cited by examiner

DUST COLLECTION SYSTEM FOR POWER TOOL

CROSS-REFERENCE TO RELATED APPLICATIONS

This application claims the benefit of priority to Japanese Patent Application No. 2019-058950, filed on Mar. 26, 2019, the entire contents of which are hereby incorporated by reference.

BACKGROUND

1. Technical Field

The present invention relates to a dust collection system for a power tool.

2. Description of the Background

A power tool such as an electric drill or a hammer drill may be used in a dust collection system in which a dust collection attachment is attached to collect and store dust from a workpiece during machining such as drilling, as one such example is described in Japanese Unexamined Patent Application Publication No. 2018-69397. In such a known dust collection system, a dust collection fan included in the dust collection attachment is rotated by a dust collection motor to suck air including dust through a suction port at a tip of the tool. The air including dust then passes through a dust box inside the dust collection attachment, where it is caught by a filter inside the dust box and stored without scattering.

BRIEF SUMMARY

In a known dust collection system, a dust collection motor operates at a constant rotational speed independently of the operation of a bit, the capacity of a dust box, or the performance of a filter in a dust collection attachment. Some dust may remain uncollected during an operation producing a large amount of dust and may scatter. Also, the operator may continue using the system without noticing that the small-capacity dust box stores much dust. Also, the operator may operate the tool without a dust box or filter attached.

One or more aspects of the present invention are directed to a dust collection system that performs appropriate control in accordance with the state of a power tool and/or a dust collection attachment.

An aspect of the present invention provides a dust collection system for a power tool, the system including:
a power tool configured to hold a tip tool;
a dust collection attachment connected to the power tool; and
a system control unit configured to control an operation of the power tool and/or the dust collection attachment in accordance with a specification of the power tool and/or the dust collection attachment.

The dust collection system according to the above aspect of the present invention performs appropriate control in accordance with the state of the power tool and/or the dust collection attachment.

DETAILED DESCRIPTION

One or more embodiments will now be described with reference to the drawings.

Figure 1:
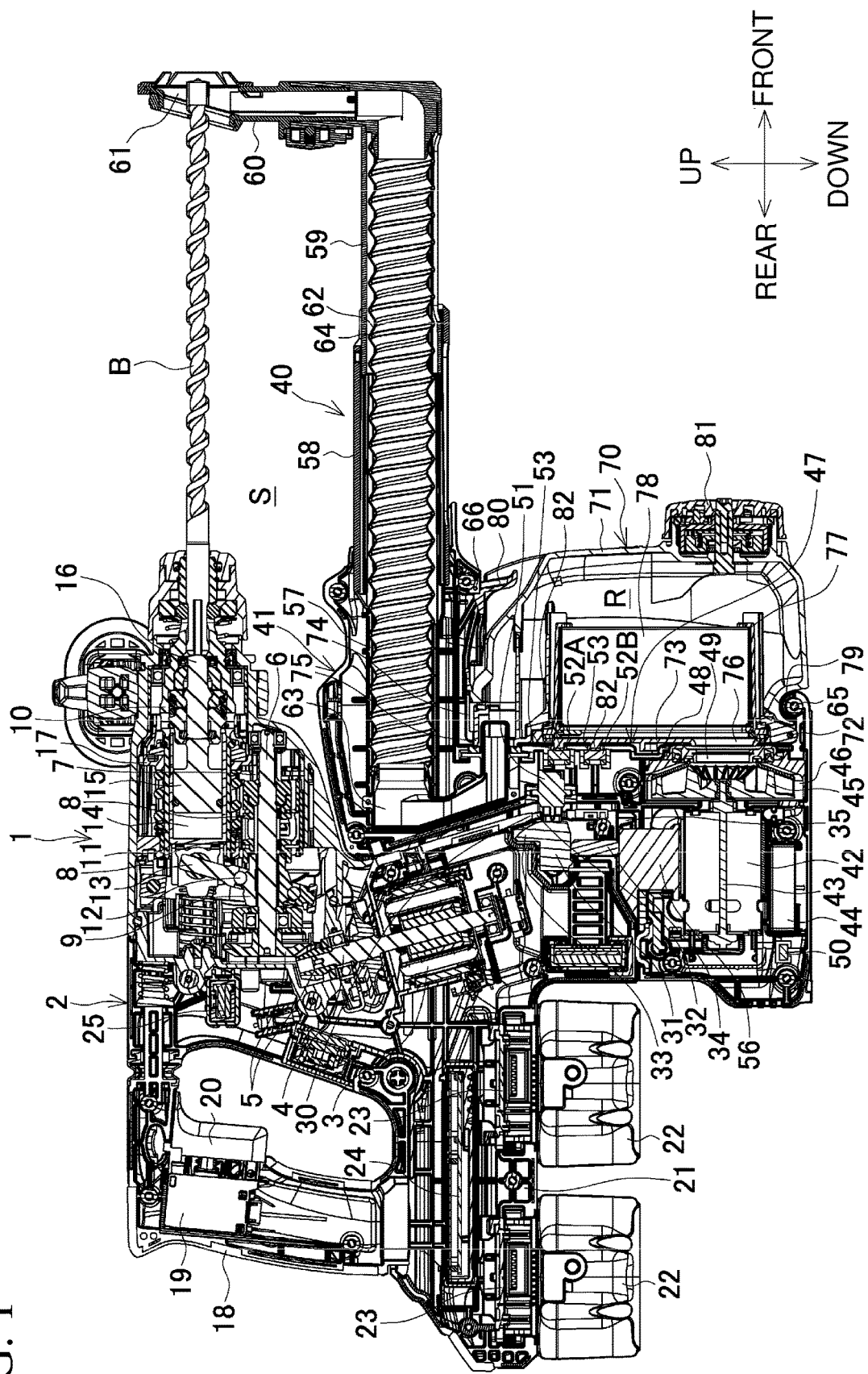
FIG. 1 is a longitudinal central sectional view of a dust collection system for a long bit.

FIG. 1 is a longitudinal central sectional view of a dust collection system S including a hammer drill 1 (an example of a power tool) to which a dust collection attachment 40 is attached.

The hammer drill 1 includes a housing 2 and a motor (brushless motor) 3. The housing 2 includes a pair of right and left halves of the housing that are assembled together. The motor 3 is accommodated in a front lower portion of the housing 2 to have an output shaft 4 tilted rearward. A countershaft 6 is supported in the front-rear direction above the motor 3. The countershaft 6 receives a torque transmitted through a bevel gear 5. The countershaft 6 receives a first gear 7, a clutch 8, and a boss sleeve 9 in this order from the front. Above the countershaft 6, a tool holder 10 is axially supported in parallel with the countershaft 6. The tool holder 10 can hold a bit B at its distal end. A piston cylinder 11 is inserted through the rear of the tool holder 10 in a movable manner. The piston cylinder 11 receives an arm 13 connected at its rear end. The boss sleeve 9 externally holds the arm 13 via a swash bearing 12 with the axis tilted. The piston cylinder 11 contains a striker 15 across an air chamber 14 in a reciprocable manner. The striker 15 can strike an impact bolt 16 located in front of the striker 15. The first gear 7 meshes with a second gear 17 attached to the tool holder 10.

A handle 18 is located in a rear upper portion of the housing 2. The handle 18 includes a switch 19 and a switch lever 20. A battery mount 21 is located below the handle 18. The battery mount 21 receives two battery packs 22 aligned in the front-rear direction as a power supply. Each battery pack 22 is slide-attached in the lateral direction. The battery mount 21 internally includes terminal blocks 23. The terminal blocks 23 are electrically connectable to the attached battery packs 22. A controller 24 is accommodated above the terminal blocks 23 to extend in the front-rear direction. The controller 24 is electrically connected to electric components including the motor 3, the switch 19, and the terminal blocks 23. The controller 24 includes a circuit board receiving, for example, a microcomputer and switching elements.

A wireless unit 25 is located on a right side surface of the housing 2 behind the countershaft 6. The wireless unit 25 is electrically connected to the controller 24. The wireless unit 25 can communicate, using a wireless communication technique such as Bluetooth (registered trademark), with an external dust collection device (not shown) that also has the wireless communication function.

The front lower portion of the housing 2 is an attachment portion 30. The attachment portion 30 has a front surface sloping downward, and protrudes in front of the battery packs 22. The attachment portion 30 receives the dust collection attachment 40. A female connector 31 is located below the motor 3 inside the attachment portion 30. The female connector 31 includes a female terminal for power supply and two female terminals for communication (three female terminals in total) arranged in the lateral direction. An insertion opening 32 is formed in the front surface of the attachment portion 30 in front of the female connector 31. The female connector 31 is supported in a manner swingable about its rear end in the up-down direction. The female connector 31 is urged to the lowermost position by a torsion spring (not shown) to allow an upper shutter 33 to close the insertion opening 32. A pressing bar 34 is located below the female connector 31 in a manner movable upward and downward. The pressing bar 34 protrudes toward the lower surface of the attachment portion 30 at the lowermost position of the female connector 31. A lower recess 35 is located at the lateral center of the lower surface of the attachment portion 30. The lower recess 35 is open frontward and downward. The pressing bar 34 protrudes in the lower recess 35. The two side surfaces of the attachment portion 30 on the right and left of the lower recess 35 each have a guide groove (not shown) extending in the front-rear direction. The guide grooves receive the dust collection attachment 40 in a slidable manner.

The dust collection attachment 40 includes a pair of right and left halves of a casing that are assembled together. The dust collection attachment 40 includes a casing 41. A rear upper portion of the casing 41 is fitted with the attachment portion 30 of the hammer drill 1. A rear lower portion of the casing 41 accommodates a dust collection motor 42. The dust collection motor 42 includes an output shaft 43 facing frontward. A dust collection controller 44 is located below the dust collection motor 42. A dust collection fan 45 is fastened to the output shaft 43. The dust collection fan 45 is accommodated in an air inlet chamber 46. The air inlet chamber 46 is a compartment defined in the casing 41, and has an air outlet (not shown) in its side surface. The casing 41 includes a connecting portion 47 at its front lower surface for a dust box 70. The connecting portion 47 is in front of the air inlet chamber 46 and recedes to have a front opening. A partition 48 behind the connecting portion 47 serving as the bottom of the connecting portion 47 has a communication hole 49. The communication hole 49 is coaxial with the dust collection fan 45, and connects the connecting portion 47 and the air inlet chamber 46. A light-emitting diode (LED) 50 for indication is located behind the dust collection controller 44 on a side surface of the casing 41. The LED 50 is electrically connected to the dust collection controller 44.

A male connector 51 is located on an upper rear surface of the casing 41. The male connector 51 includes three plate-like male terminals for power supply and for communication in total. The male terminals protrude rearward.

Two button switches 52A and 52B are aligned vertically in front of the male connector 51 on the rear surface of the partition 48. The button switches 52A and 52B each have a front surface as a pressing surface (operational surface), which is placed through a through-hole 53 in the partition 48 to be contained in the connecting portion 47.

A pair of guide rails 55 (FIG. 2) are located on the right and left on a rear upper surface of the casing 41. The guide rails 55 extend in the front-rear direction, and can be fitted in the guide grooves on the right and left surfaces of the attachment portion 30. The rear upper surface of the casing 41 includes an upward pressing member 56 between the guide rails 55. The upward pressing member 56 has a rear surface sloping downward. When the attachment portion 30 is fitted, the upward pressing member 56 enters the lower recess 35 and presses the pressing bar 34 upward.

In the casing 41, a guide passage 57 extends above the connecting portion 47 in the front-rear direction. The guide passage 57 has an open front end, and a rear end bent in a U shape to extend behind the connecting portion 47. The guide passage 57 holds a guide cylinder 58 protruding forward. A slide cylinder 59 is internally connected to the guide cylinder 58 in a manner movable in the front-rear direction. A nozzle 60 is connected to the front end of the slide cylinder 59. The nozzle 60 is L-shaped and has a tip upward. The nozzle 60 has a cylindrical suction port 61 in its tip. A bit B coaxially passes through the suction port 61.

The guide passage 57 and the slide cylinder 59 internally accommodate a flexible hose 62. The flexible hose 62 has a front end connected to the nozzle 60, and a rear end connected to a duct 63. The duct 63 is a cylinder bent in a U shape in conformance with the rear end shape of the guide passage 57. A spiral wire 64 is located integrally with the flexible hose 62 to urge the flexible hose 62 in an extension direction. The flexible hose 62 urges the nozzle 60 and the slide cylinder 59 forward. A lower end portion of the duct 63 passes through the partition 48, and protrudes inside the connecting portion 47. A receiving shaft 65 protrudes laterally at the lower end of the connecting portion 47 and in front of the partition 48. An engagement protrusion 66 is located at a frontward position on an upper inner surface of the connecting portion 47. The engagement protrusion 66 engages with an upper side of the dust box 70.

The dust box 70 includes a box body 71 and a lid 73. The box body 71 is a deep box having an opening rearward. The lid 73 is a vertically long rectangle, and is connected to a portion below the opening of the box body 71 with a hinge shaft 72 in a rotatable manner.

The lid 73 has an engagement tab 74 on its upper end. The engagement tab 74 is a loop that engages with the upper surface of the box body 71 in a closed state of the opening of the box body 71 and maintains the closed state. The lid 73 has a rectangular inlet 75 extending laterally on its upper end. The inlet 75 receives the lower end portion of the duct 63 when the lid 73 is attached to the connecting portion 47. The lid 73 has a circular outlet 76 on its lower end. The outlet 76 faces the communication hole 49 when the lid 73 is attached to the connecting portion 47.

A filter compartment 77 is located in front of the outlet 76 of the lid 73. The filter compartment 77 holds a paper filter 78 folded laterally with vertical folds. In this state, the tops of the vertical folds of the filter 78 are exposed at equal intervals in the lateral direction. The right and left sides of the filter 78 are also exposed inside the box body 71.

The lower surface of the box body 71 has a groove 79 to fit with the receiving shaft 65 for the connecting portion 47. An operation tab 80 is located on the upper surface of the box body 71 to elastically engage with the engagement protrusion 66 on the connecting portion 47. A dust removal knob 81 is located on a front lower surface of the box body 71. The dust removal knob 81 is rotated to vibrate the box body 71 to remove accumulating dust off the filter 78.

Protrusions 82 are located between the inlet 75 and the outlet 76 on the rear surface of the lid 73. The protrusions 82 correspond to the button switches 52A and 52B on the partition 48. The number of protrusions 82 differs depending on the specifications of the dust box 70. The dust box 70 is attached to change the on/off states of the button switches 52A and 52B. A combination of the on/off states of the button switches 52A and 52B can be associated with each set of specifications of the dust box 70. The dust collection controller 44 identifies each set of specifications of the dust box 70 based on the combination of the on/off states of the button switches 52A and 52B.

Figure 2A:
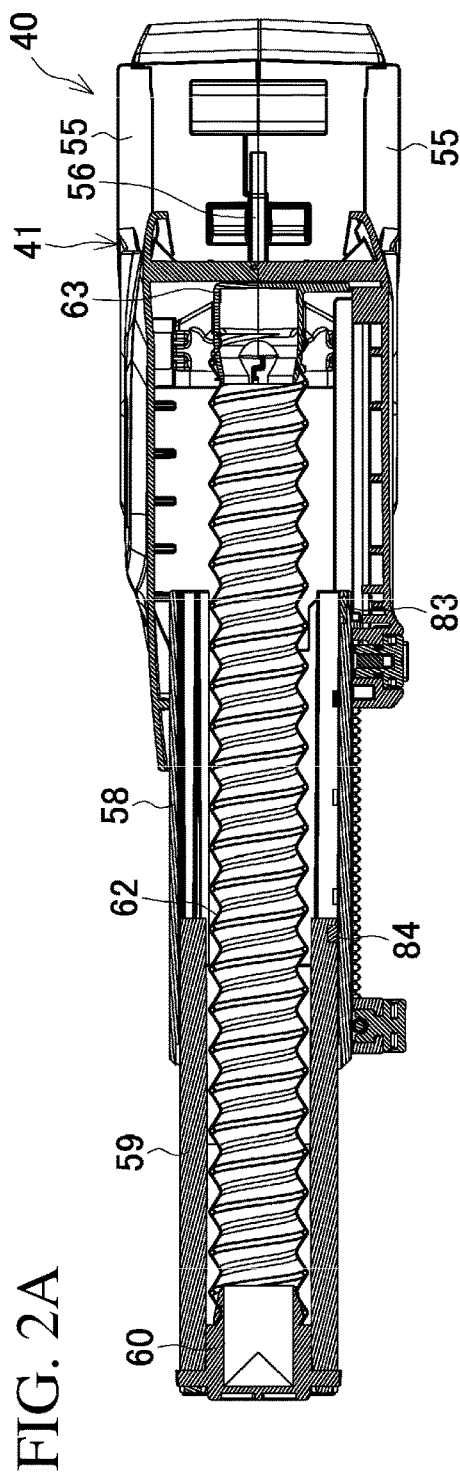
FIG. 2A is a diagram describing the structure for determining the bit length of a long bit.
Figure 2B:
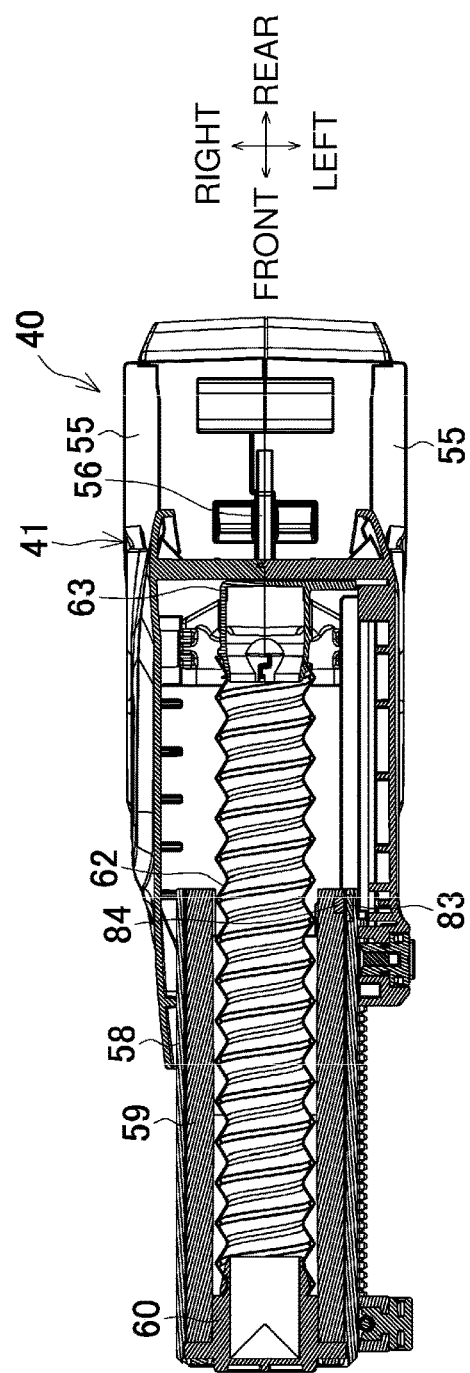
FIG. 2B is a diagram describing the structure for determining the bit length of a normal bit.
Figure 3:
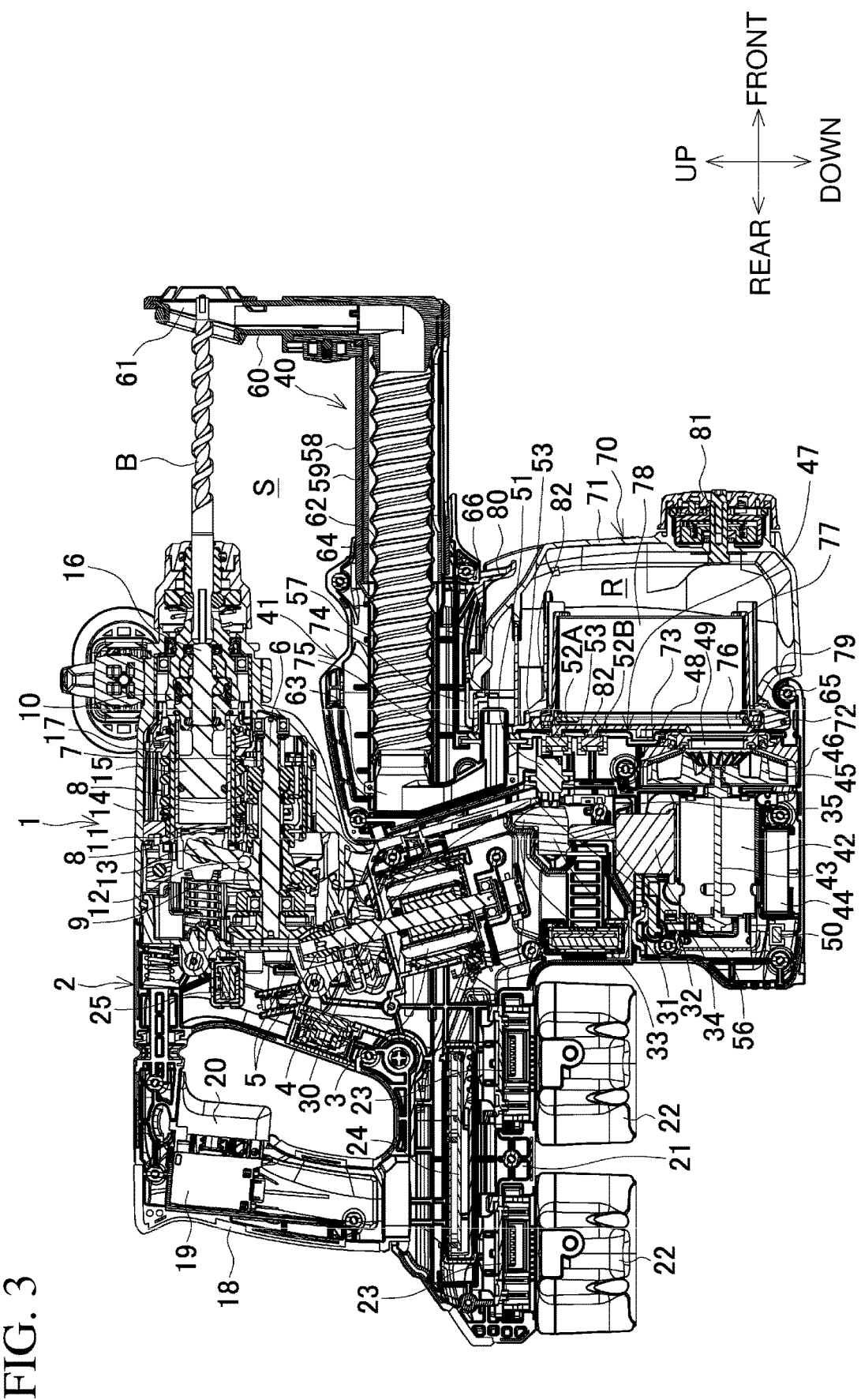
FIG. 3 is a longitudinal central sectional view of the dust collection system for a normal bit.

As shown in FIGS. 2A and 2B, a detection unit 83, such as a Hall device, is located at an inner rear end of the guide cylinder 58 in the casing 41. The detection unit 83 is electrically connected to the dust collection controller 44. A magnet 84 is located at an outer rear end of the slide cylinder 59. The magnet 84 faces the detection unit 83 when the slide cylinder 59 is at the rearmost position. The detection unit 83 detects a change in the magnetic field of the magnet 84 that moves in cooperation with the slide cylinder 59 moving back and forth. The dust collection controller 44 thus detects the position of the slide cylinder 59 in the front-rear direction, and determines the length of the bit B corresponding to the position in the front-rear direction. FIGS. 1 and 2A show the system for a long bit. FIGS. 2B and 3 show the system for a normal bit.

The dust collection controller 44 performs preset control in accordance with the on/off states of the button switches 52A and 52B and the set of specifications identified by the detection unit 83. Example sets of specifications to be identified and their associated control will be described below.

(1) The capacity of the dust box 70 is determined to change the setting for maintenance timing. The setting for maintenance timing may be a threshold to be compared with the cumulative operating time. For example, the threshold is set higher for the dust box 70 having a large capacity, and is set lower for the dust box 70 having a small capacity.

(2) The type (performance) of the filter 78 is determined to rotate the dust collection motor 42 at a higher rotational speed for a high-performance filter, or at a lower rotational speed for a low-performance filter. A high-performance filter may be a high-efficiency particulate air (HEPA) filter with high filtering efficiency, or may be a filter using a cloth filter and a paper filter in combination.

(3) The length of the bit B is determined to rotate the dust collection motor 42 at a higher rotational speed for a long bit, or at a lower rotational speed for a normal bit.

Figure 4:
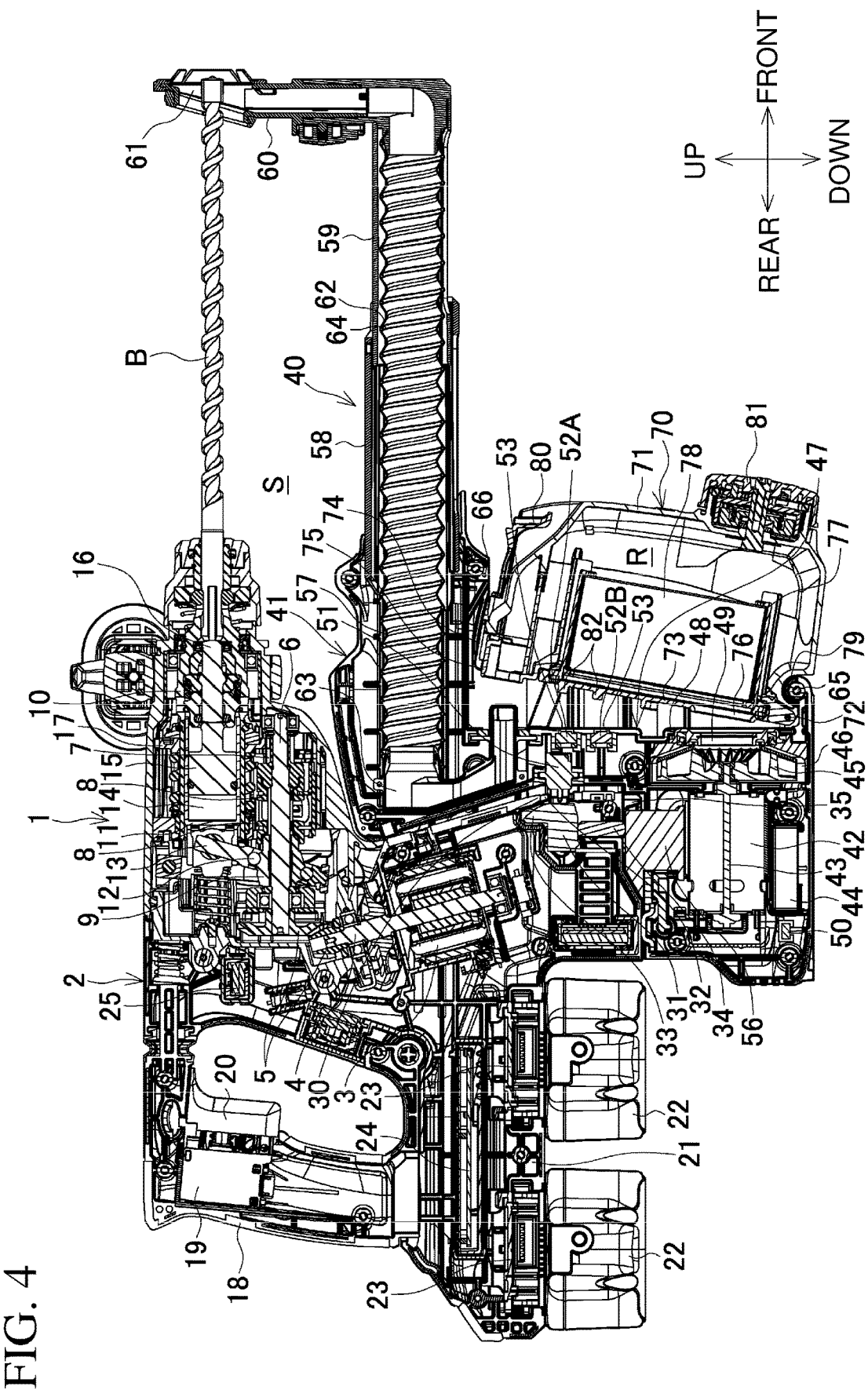
FIG. 4 is a longitudinal central sectional view of the dust collection system with a dust box attached.

As shown in FIG. 4, the lid 73 facing rearward is placed to have an inclined posture with the groove 79 fitted with the receiving shaft 65 from the front. The lid 73 is then pressed into the connecting portion 47 to be raised upright with the operation tab 80 elastically engaged with the engagement protrusion 66, thus allowing attachment to the connecting portion 47. In the attached state, the duct 63 has its distal end fitted with the inlet 75 to protrude into the box body 71. The outlet 76 thus faces the communication hole 49 and communicates with the air inlet chamber 46. The dust collection attachment 40 defines an internal dust collection path R for sucking air through the suction port 61 and through the nozzle 60, the flexible hose 62, the duct 63, and the filter 78 in the box body 71 to the air inlet chamber 46.

In the dust collection system S according to the present embodiment, the dust collection attachment 40 is attached to the hammer drill 1 by first aligning the guide grooves on the attachment portion 30 with the guide rails 55 on the casing 41 to place the attachment portion 30 above the rear portion of the casing 41. The dust collection attachment 40 is then slid rearward to fit the casing 41 with the attachment portion 30 from the front. Thus, the guide rails 55 are fitted into the right and left guide grooves on the attachment portion 30 for connecting the attachment portion 30 with the guide rails 55. The upward pressing member 56 enters the lower recess 35 and presses the pressing bar 34 upward. This moves the shutter 33 upward to swing the female connector 31 to the uppermost position facing the insertion opening 32. The dust collection attachment 40 thus allows the male terminals of the male connector 51 to enter the housing 2 through the insertion opening 32. The male terminals are thus electrically connected to the female terminals of the female connector 31.

The suction port 61 is placed to abut against a target surface of a workpiece, and the switch lever 20 is pressed. The switch 19 is turned on to cause the controller 24 to drive the motor 3 and rotate the countershaft 6. A switching knob (not shown) on a side surface of the housing 2 is operated to slide the clutch 8 for selecting a drill mode, a hammer mode, or a hammer drill mode. In the drill mode, the clutch 8 is at a frontward position to mesh with the first gear 7 alone. In the hammer mode, the clutch 8 is at a rearward position to mesh with the boss sleeve 9 alone. In the hammer drill mode, the clutch 8 is at a middle position to mesh with the first gear 7 and the boss sleeve 9 at the same time.

In the drill mode, the tool holder 10 is rotated with the second gear 17 to rotate the bit B. In the hammer mode, the arm 13 swings to reciprocate the piston cylinder 11. The striker 15 is operated through the air chamber 14 in cooperation with the piston cylinder 11, and strikes the bit B with the impact bolt 16. In the hammer drill mode, the tool holder 10 rotates and the impact bolt 16 is struck at the same time.

When the switch 19 is turned on, the controller 24 provides power to the dust collection controller 44. The dust collection controller 44 then determines the on/off states of the button switches 52A and 52B, the capacity of the dust box 70, and the type of the filter 78. Also, the detection unit 83 detects the position of the slide cylinder 59 in the front-rear direction, and determines the length of the bit B. The dust collection controller 44 further starts counting the operating time for the dust collection attachment 40, and determines the threshold for the cumulative operating time in accordance with the determined type of the filter 78 for maintenance timing indication.

When neither the button switches 52A nor 52B is turned on, the dust collection controller 44 transmits, to the controller 24, information indicating that the dust box 70 has yet to be attached. The controller 24 then stops driving the motor 3. The controller 24 does not drive the dust collection motor 42. The LED 50 indicates an error.

With the suction port 61 positioned for operation, the hammer drill 1 is moved forward to move the nozzle 60 and the slide cylinder 59 rearward. The bit B thus passes through the suction port 61 and machines the workpiece. Once the machining starts, the dust collection controller 44 drives the dust collection motor 42 to rotate the dust collection fan 45. The dust collection motor 42 is rotated at a predetermined rotational speed in accordance with the capacity of the dust box 70, the type of the filter 78, and the length of the bit B determined earlier. For example, the rotational speed is set higher when the dust box 70 has a large capacity or when the filter 78 has high filtering efficiency. Once the detection unit 83 determines that the bit B is a long bit, the dust collection controller 44 rotates the dust collection motor 42 at a higher rotational speed although the dust box 70 has a small capacity and the filter 78 has low filtering efficiency. When the filter 78 has high filtering efficiency, the threshold for the cumulative operating time is set higher.

The dust collection fan 45 rotates to suck the outside air through the suction port 61, which then passes through the nozzle 60, the dust collection path R, and the air inlet chamber 46 and is discharged outside through the air outlet. Thus, dust from the workpiece is sucked through the suction port 61, enters the dust box 70 through the nozzle 60, the flexible hose 62, and the duct 63, and passes through the filter compartment 77 and is caught by the filter 78 and stored in the box body 71.

When the cumulative operating time of the dust box 70 reaches the threshold, the dust collection controller 44 provides a maintenance notification. The maintenance notification is provided by, for example, lighting the LED 50 or producing an electronic sound or a buzzer sound.

After the dust collection system S stops operating, the operator slides the dust collection attachment 40 forward to detach it from the hammer drill 1 with the procedure reverse to the attachment of the dust collection attachment 40. In the dust collection attachment 40, the operation tab 80 is pressed down and disengaged from the engagement protrusion 66, and the dust box 70 is rotated about the receiving shaft 65 to have its upper portion pulled down forward, and is thus detached from the connecting portion 47. The engagement tab 74 on the lid 73 is disengaged from the box body 71 to open the lid 73, and dust can be discarded from the box body 71 through the opening of the box body 71. To discard dust, the dust box 70 alone may be detached without detaching the dust collection attachment 40 from the hammer drill 1. The filter 78 may be cleaned or changed as appropriate. The suction force is thus restored to allow use of the dust collection system S. The cumulative operating time is reset when the dust box 70 is detached.

In the dust collection system S according to the present embodiment, the dust collection controller 44 (system control unit) controls the operation of the hammer drill 1 that can hold the bit B (tip tool) and/or the dust collection attachment 40 in accordance with the specifications of the hammer drill 1 and/or the dust collection attachment 40. The system thus performs appropriate control in accordance with the state of the hammer drill 1 and/or the dust collection attachment 40.

In particular, the dust collection controller 44 allows timely maintenance in accordance with the capacity of the dust box 70, thus allows timely maintenance including dust removal or disposal.

The dust collection controller 44 controls the rotational speed of the dust collection motor 42 in accordance with the performance of the filter 78. For the filter 78 with high performance (e.g., high filtering efficiency), the dust collection controller 44 increases the rotational speed of the dust collection motor 42 to increase the dust collection efficiency.

The dust collection controller 44 identifies the specifications by detecting the number of protrusions 82 on the dust box 70. This simple structure including the button switches 52A and 52B and the protrusions 82 allows reliable identification of multiple sets of specifications.

The dust collection controller 44 does not drive the dust collection motor 42 when the dust box 70 has yet to be attached. This prevents an operation without collecting dust, and thus prevents scattering dust.

The dust collection controller 44 controls the rotational speed of the dust collection motor 42 in accordance with the specifications of the bit B, or specifically, the type (length) of the bit B. This allows dust collection in accordance with the amount of dust generated.

Figure 5:
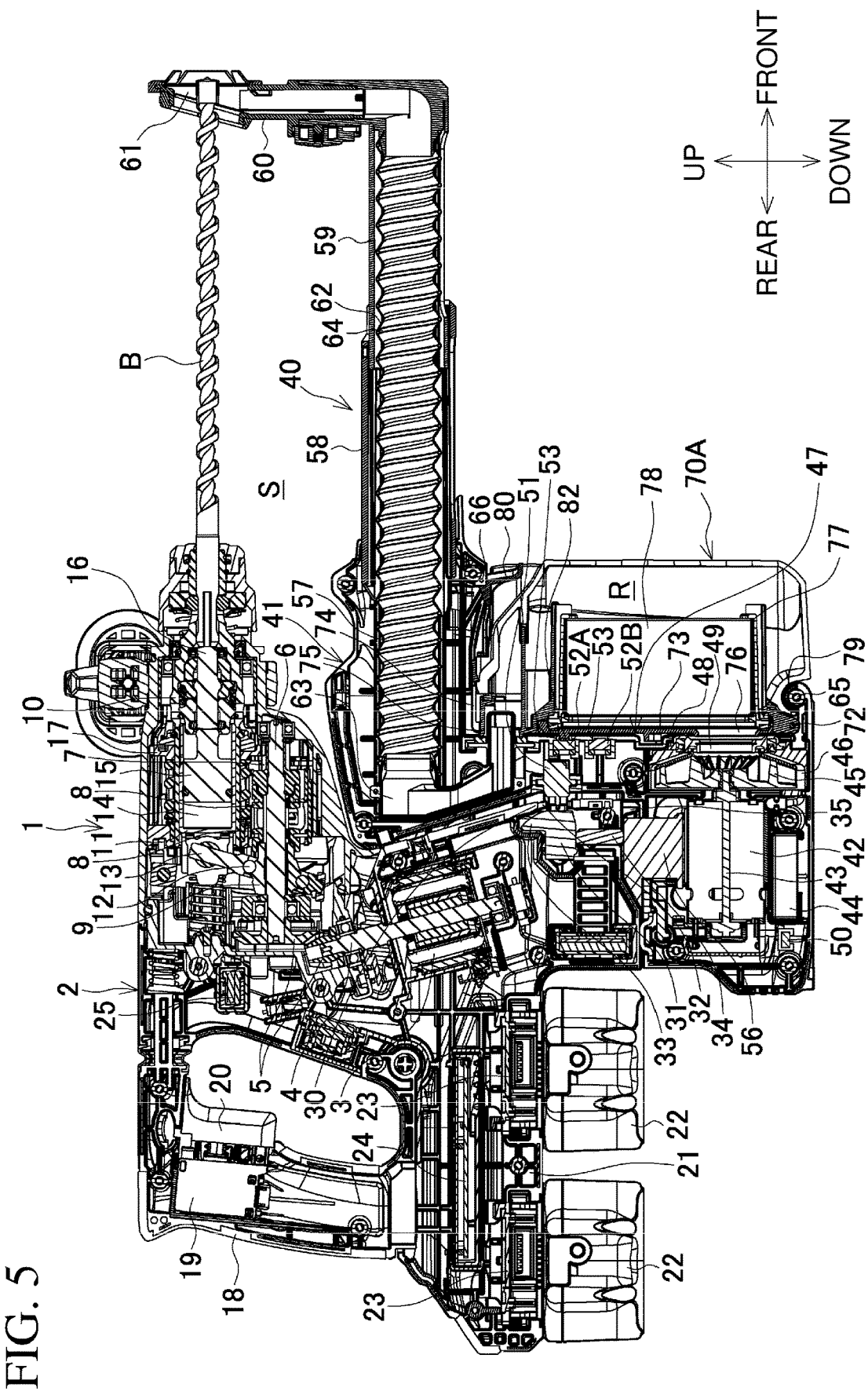
FIG. 5 is a longitudinal central sectional view of a dust collection system with no dust removal knob.
Figure 6:
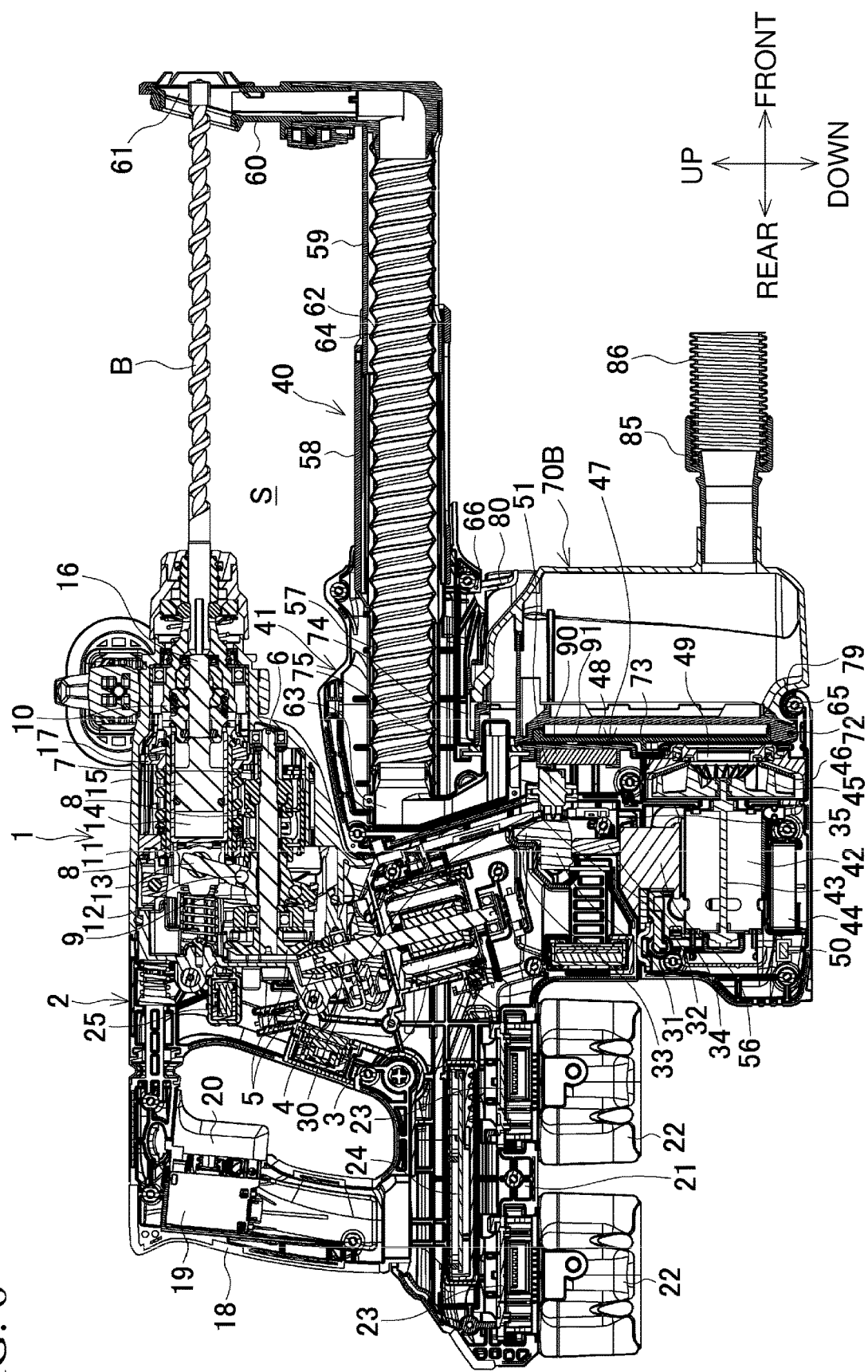
FIG. 6 is a longitudinal central sectional view of a dust collection system to which a dust collection hose is connected.

The specifications to be identified by the dust collection controller 44 may not be limited to those described in the above embodiment, and may include the specifications of a dust box 70A including the box body 71 with no dust removal knob as shown in FIG. 5, or the specifications of a dust box 70B including the lid 73 with no filter or no outlet to the dust collection fan and connectable to a hose 86 from an external dust collection device with a joint 85 as shown in FIG. 6.

As shown in FIGS. 1 and 5, the dust removal knob is detectable. Once the dust removal knob is detected, early indication may be generated to prompt dust removal and delay the timing for maintenance of the filter 78. Any dust removal mechanisms other than the dust removal knob may be used.

In the system shown in FIG. 6, the wireless unit 25 may allow cooperation with a dust collection device to collect dust. This structure may drive the motor 3 alone without driving the dust collection motor 42, and thus prevent unintended operation of the dust collection motor 42. This structure may eliminate the filter.

Further, the specifications of the tip tool to be identified may include the diameter of the gimlet bit, in addition to the length of the bit.

When various sets of specifications are to be identified as described above, more button switches may be located on the casing or more protrusions may be located on the dust box, or the protrusions may have different heights to allow different pressing depths to be detected for the button switches. The protrusions may not be located on the dust box, but may be located on the filter to allow determination on whether the filter is attached.

Instead of the determination mechanism including the button switches and the protrusions, as shown in FIG. 6, the partition 48 may include a reader/writer unit 90 electrically connectable to the dust collection controller 44 on its rear surface, and the lid 73 may include an information storage 91, such as an IC tag, on its rear surface in front of the reader/writer unit 90. This contactless determination mechanism can obtain information about more sets of specifications than a mechanism using button switches.

To control the system, the controller for the hammer drill alone may be used instead of the dust collection controller, or both the controllers may be used.

In some embodiments, the hammer drill may include a motor oriented differently or a motor of a different type or battery packs arranged differently as appropriate. The hammer drill may be powered by alternating current (AC) and may include a power cord, instead of battery packs. The dust collection attachment may also have any structure for connection to the hammer drill, any arrangement of the dust box, and any structure for connection of the dust box other than those described in the above embodiment.

The present invention is applicable not only to a hammer drill but also to other power tools to which a dust collection attachment, such as an electric drill and an electric hammer, is connected.

REFERENCE SIGNS LIST 1 hammer drill
2 housing
3 motor
4, 43 output shaft
6 countershaft
10 tool holder
19 switch
20 switch lever
24 controller
25 wireless unit
30 attachment portion
40 dust collection attachment
41 casing 42 dust collection motor
44 dust collection controller
45 dust collection fan
46 air inlet chamber
47 connecting portion
49 communication hole
50 LED
52A, 52B button switch
59 slide cylinder
60 nozzle
61 suction port
62 flexible hose
70, 70A, 70B dust box
71 box body
73 lid
77 filter compartment
78 filter
81 dust removal knob
82 protrusion
83 detection unit
84 magnet
S dust collection system
B bit
R dust collection path

What is claimed is:

1. A dust collection system for a power tool, the system comprising:
   a power tool configured to hold a tip tool;
   a dust collection attachment connected to the power tool and including
   a dust box configured to store dust, and
   a dust collection motor configured to collect dust into the dust box; and
   a system control unit configured to manage timing for maintenance of the dust box in accordance with a capacity of the dust box.

2. The dust collection system according to claim 1, wherein the system control unit counts a cumulative operating time for the power tool after the dust box is connected to the power tool.

3. The dust collection system according to claim 2, wherein the system control unit provides a maintenance notification when the cumulative operating time exceeds a threshold.

4. The dust collection system according to claim 3, wherein the system control unit sets a higher threshold for the dust box having a larger capacity.

5. The dust collection system according to claim 4, wherein the system control unit manages the timing for maintenance based on whether the dust box includes a dust removal mechanism.

6. The dust collection system according to claim 4, wherein the dust box includes a filter, and
   the system control unit controls a rotational speed of the dust collection motor in accordance with performance of the filter.

7. The dust collection system according to claim 3, wherein
   the system control unit manages the timing for maintenance based on whether the dust box includes a dust removal mechanism.

8. The dust collection system according to claim 7, wherein
   the system control unit sets a higher threshold for the dust box including the dust removal mechanism.

9. The dust collection system according to claim 3, wherein
   the dust box includes a filter, and
   the system control unit controls a rotational speed of the dust collection motor in accordance with performance of the filter.

10. The dust collection system according to claim 2, wherein
    the system control unit manages the timing for maintenance based on whether the dust box includes a dust removal mechanism.

11. The dust collection system according to claim 2, wherein the dust box includes a filter, and
    the system control unit controls a rotational speed of the dust collection motor in accordance with performance of the filter.

12. The dust collection system according to claim 1, wherein
    the system control unit manages the timing for maintenance based on whether the dust box includes a dust removal mechanism.

13. The dust collection system according to claim 12, wherein
    the dust box includes a filter, and
    the system control unit controls a rotational speed of the dust collection motor in accordance with performance of the filter.

14. The dust collection system according to claim 1, wherein
    the dust box includes a filter, and
    the system control unit controls a rotational speed of the dust collection motor in accordance with performance of the filter.

15. The dust collection system according to claim 14, wherein
    the system control unit controls the dust collection motor to remain non-operating when the filter has yet to be attached.

16. The dust collection system according to claim 1, wherein
    the dust box includes a protrusion, and
    the system control unit identifies a specification of the dust box based on the number of protrusions and/or a height of the protrusion included in the dust box.

17. The dust collection system according to claim 1, wherein
    the system control unit controls the dust collection motor to remain non-operating when the dust box has yet to be attached.

18. The dust collection system according to claim 1, wherein
    the system control unit controls a rotational speed of the dust collection motor in accordance with a type of the tip tool.

* * * * *